US006602484B1

(12) United States Patent
Virtanen

(10) Patent No.: US 6,602,484 B1
(45) Date of Patent: Aug. 5, 2003

(54) PRECIPITATED CALCIUM CARBONATE AND METHOD FOR THE PRODUCTION THEREOF

(75) Inventor: Pentti Virtanen, Toijala (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 09/284,499

(22) PCT Filed: Oct. 14, 1997

(86) PCT No.: PCT/FI97/00627

§ 371 (c)(1),
(2), (4) Date: Apr. 14, 1999

(87) PCT Pub. No.: WO98/16471

PCT Pub. Date: Apr. 23, 1998

(30) Foreign Application Priority Data

| Oct. 14, 1996 | (FI) | ................................................. 964130 |
| Oct. 22, 1996 | (FI) | ................................................. 964247 |
| Sep. 8, 1997 | (FI) | ................................................. 973633 |

(51) Int. Cl.$^7$ ............................................... C01F 11/18
(52) U.S. Cl. ...................................... 423/430; 423/432
(58) Field of Search ................................. 423/430, 432, 423/268

(56) References Cited

U.S. PATENT DOCUMENTS

| 4,159,312 A | * | 6/1979 | Shibazaki et al. ........... 423/430 |
| 4,219,590 A | | 8/1980 | Shibazaki et al. ........... 423/432 |
| 4,714,603 A | | 12/1987 | Vanderheiden ............... 423/430 |
| 5,007,964 A | * | 4/1991 | Tsukisaka et al. ........... 423/432 |
| 6,143,064 A | | 11/2000 | Virtanen ..................... 106/449 |

FOREIGN PATENT DOCUMENTS

| JP | 57-123822 | 8/1982 |
| JP | 3-14696 | 1/1991 |
| JP | 4-305012 | 10/1992 |
| JP | 2000-506205 | 5/2000 |
| WO | 9206038 | 4/1992 |
| WO | 9320010 | 10/1993 |
| WO | 9623728 | 8/1996 |
| WO | 9732934 | 9/1997 |
| WO | 9738940 | 10/1997 |

\* cited by examiner

*Primary Examiner*—Stuart L. Hendrickson
(74) *Attorney, Agent, or Firm*—Birch, Stewart, Kolasch & Birch, LLP

(57) ABSTRACT

The invention concerns precipitated calcium carbonate products containing polynuclear regular agglomerates having a number of calcium carbonate particles (aggregates) attached to each other and having a particle size of about 40 to 200 nm. According to the invention, these products are prepared by adjusting the Z potential of the calcium carbonate suspension to $-1 \ldots -20$ mV by adjusting the pH of the suspension to $6.5 \ldots 9.5$. The pH of the calcium carbonate slurry obtained by causticizing is adjusted to a desired value in a box filter, where after the suspension is stirred by a heavy-duty mixer such that it is subjected to differences of about 50 to 200 m/s in peripheral speed. The products according to the invention have good opacity and are very well suited for coating paper.

13 Claims, 5 Drawing Sheets

$$CaO + CO_2 + (H_2O) + TiO_2 \longrightarrow CaCO_3 + TiO_2 + (H_2O)$$

PRECIPITATED CALCIUM CARBONATE AND METHOD FOR THE PRODUCTION THEREOF

This application is the national phase under 35 U.S.C. §371 of prior PCT International Application No. PCT/FI97/00627 which has an International filing date of Oct. 14, 1997 which designated the United States of America.

BACKGROUND OF THE INVENTIONS

The present invention relates to a precipitated calcium carbonate product.

The invention also relates to a process for preparing such a calcium carbonate product.

In recent years, particularly since 1990, great interest has been focused on precipitated calcium carbonate as a filling and coating material for paper and plastics. A large number of patents has been published relating to this theme because precipitated calcium carbonate (PCC) has proved a many-sided paper filling and coating pigment. PCC provides good opacity and brightness and protects acidic papers against embrittlement and yellowing caused by aging.

The main forms of existence of PCC are calcite, aragonite and vaterite, the first one having a mainly cubic, vaterite an amorphous and spherical, and aragonite an oblong, even acicular, basic crystal form. Intermediate crystal forms are also known and termed rosettes and/or scalenohedral crystals. These mainly resemble a rose bloom in shape.

As a filling or coating agent for paper, finely divided PCC is particularly well suited. The preparation thereof is described, among others, in WO Published Application No. 96/23728 which shows how minute, mainly spherical PCC particles can be produced by means of a causticizing reaction, the dimensions of such particles being 0.2 to 0.4 micrometers. In a solution described in US Pat. No. 4,367,207, fine PCC material is prepared by keeping the temperature of the reaction medium at a value below 18° C.

In the prior art, attempts have also been made to obtain finely divided crystals and/or flocs thereof by using auxiliary chemicals. The retention of PCC can be improved by crystal flocculation in connection with paper manufacture. Thus, U.S. Pat. No. 5,332,564 teaches how fine pigment is prepared by adding a small amount of sugar into the water used for slaking the lime. The use of sugar for preventing crystallization has mainly been known in the context of the production of concrete.

One of the main disadvantages of PCC in paper manufacture is it reactivity and disintegration under acidic conditions, such as in the circulation water of a paper machine, because acids which are stronger than carbonic acid are always present. In order to eliminate this problem, the PCC particles have been treated by letting them react to a certain degree with, e.g., phosphoric acid and/or known derivatives thereof. Such inventions have been described, for instance, in U.S. Pat. Nos. 4,219,590 and 4,927,618. In the case of finely divided particles, the further problem is usually present that they are difficult to filter because the particles easily block the pores of filters.

The aim of the present invention is to remove the drawbacks of the prior art and to obtain an entirely novel type of PCC product.

As stated above, by the method described in WO Published Application No. 96/23728, minute PCC particles which are almost equal in size can be obtained. In the present invention, it has surprisingly been found that these can be joined together to form regular polynuclear agglomerates or botryoidal bunches whereby their separation from reaction suspensions is essentially facilitated. The agglomerates according to the invention are spherical and contain several spherical calcium carbonate particles which are attached to one another and have a particle size of about 40 to 400 nm, typically about 40 to 100nm. The particles of precipitated calcium carbonate according to the invention are formed into polynuclear bunches or agglomerates by adjusting the Z potential of the particles to a value from −1 to −20 mV. This can be achieved, e.g., in the case of an (alkaline) slurry produced by causticizing by adjusting the pH of the particle slurry to a value from 6.5 to 9.5, preferably from 7.5 to 9.3, in a box filter. Next, the slurry is stirred advantageously in a shock mixer such that the differences in peripheral velocity imposed on the slurry are in the range from 50 to 200 m/s. Correspondingly, a slurry can be formed from the product obtained from carbonization, and its pH is adjusted to a value within a suitable pH range.

In more detail the calcium carbonate products according to the invention are characterized by being in the form of polynuclear spherical agglomerates containing a number of spherical calcium carbonate particles (or aggregates) which are attached to each other and have a particle size of approximately 40 to 200 nm.

SUMMARY OF THE INVENTION

The process for its part is characterized by calcium oxide containing starting material being reacted with carbonate ions to form calcium carbonate, the Z potential of the calcium carbonate is adjusted to −1 to −20 mV in a suspension, and the calcium carbonate is recovered in the form of agglomerates whose size is approximately 0.1 to 10 μm and which contain calcium carbonate particles (or aggregates) having a size of approximately 40 to 200 nm.

The invention offers considerable benefits. Thus, as already stated above, the separation of calcium carbonate crystals in aggregate or agglomerate (botryoidal bunch) form from a suspension by filtering is easier and less costly than that of conventional fine crystals. In addition, bunches according to the invention are rich in internal reflecting surfaces which improve the opacity of pigments and fillers. In this context it may be mentioned that small foam beads of polystyrene, among others, have previously been suggested for paper coating because they contain a large number of micronic reflecting surfaces within the particle. The use of, among others, calcinated kaolin and structured pigments is based on the same phenomenon. These structured pigments are such pigments onto whose surface the same or a different material has been inoculated in different particle sizes. In this manner it is possible to increase the diffuse reflection of light which increases the likelihood of a ray of light impinging on a reflecting surface. By means of the present invention a calcium carbonate cluster can be obtained with the above-mentioned numerous internal reflecting surfaces which have been brought about essentially without using chemicals. The agglomerates hold together due to van der Waals forces. The product is excellently suited for use in the coating and filling of paper because no chemicals are used, wherefore the paper is flexibly deformed in connection with, e.g. supercalendering.

In the following, the invention is examined in closer detail by means of the annexed drawings and a detailed description.

DETAILED DESCRIPTION

The theory behind the invention is briefly explained below with reference to the preparation of precipitated calcium carbonate.

It is an aim of the invention to achieve a solid matter mixture (dispersion) containing, e.g. calcium carbonate, wherein the particles remain detached at high, even 70% solids contents and at high viscosity values (about 200 cP). Controlling the attractive and repulsive forces between the particles will also further this aim, as does removing the capillary forces between the particles. Attractive forces between the particles are represented by, among others, the van der Waals force which increases with diminishing particle distances and smaller particle diameters. Thus, at a particle diameter of 0.1 $\mu$m the van der Waals force is approximately 1,000,000 N/mm². With increasing particle distances the van der Waals force is rapidly reduced and is only about 1,000 N/mm² when the diameter is 100 $\mu$m. Repulsive forces between particles are represented by the Z or zeta potential which is an electric tension difference between the ion field of the particle and the medium. The fields of the same sign of the particles give rise to the repulsive force. The capillary force arises when air is blown out of the space between the particles.

When no additive modifying the particle surface is used, the dependence of the Z potential on the pH value can be readily observed in a repeatable manner. This will also emerge from the annexed FIG. 1. In the Figure, the points representing the value of the zeta potential are marked with black triangles and the points representing the size of the PCC particles with white triangles.

The zeta potential of PCC varies in the case of calcium carbonate as a function of pH in the range from −25 to −1 mV. At pH 8.2 to 8.4 the zeta potential is at its lowest (approximately −1 to −5 mV) and accordingly, the force causing the distance between the particles to increase is also at its lowest.

Precipitated calcium carbonate particles according to the invention are brought to such a distance from one another that they are within the area of influence of van der Waals forces by producing particles having diameters<0.1 $\mu$m and by adjusting the pH the dispersion containing the PCC particles to a value in the range from 6.5 to 9.5 in order to minimize the zeta potential.

Figure 1:
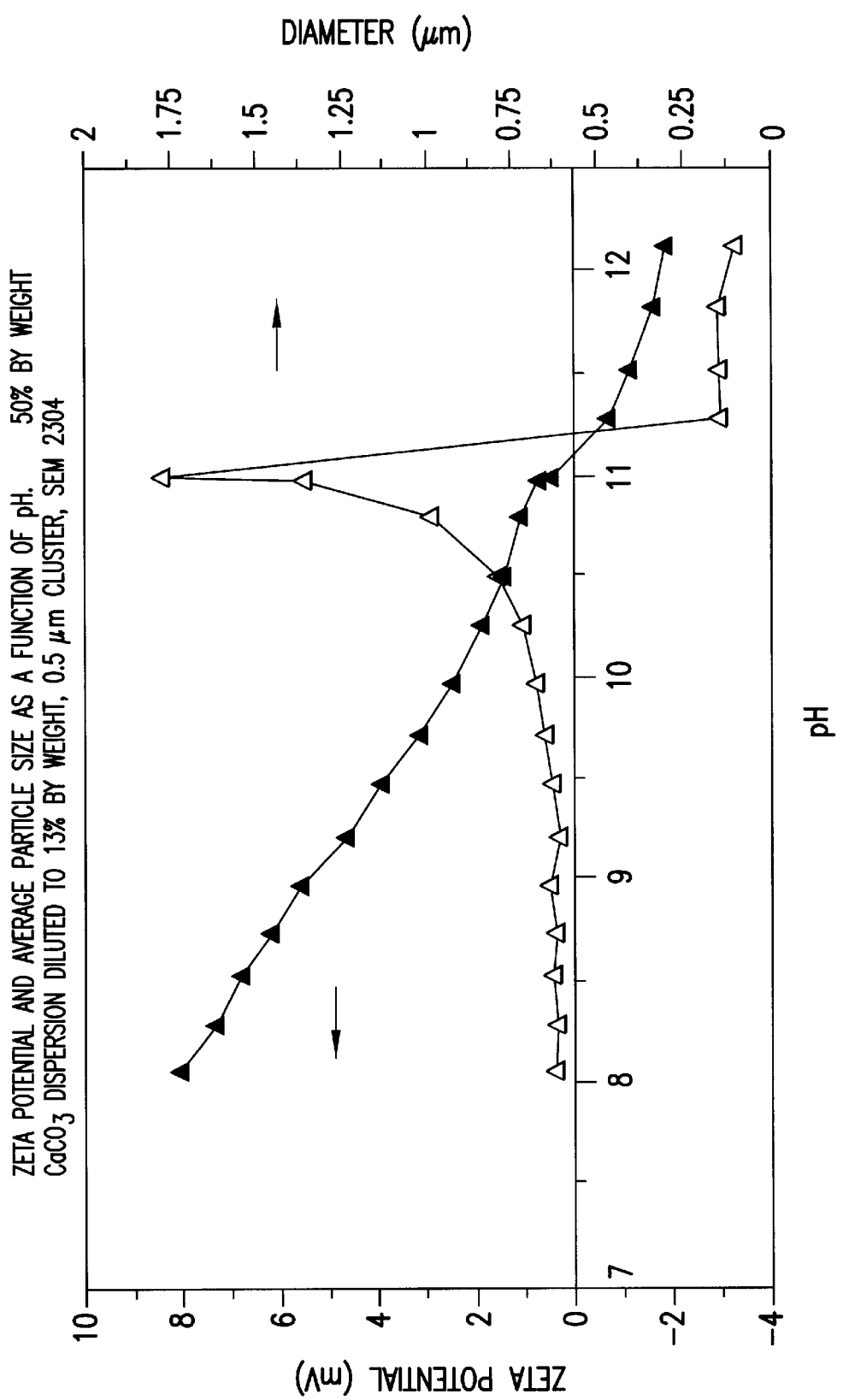
FIG. 1 depicts the zeta potential of the PCC slurry and the particle size of the PCC as a function of pH.

It will also emerge from FIG. 1 that the size of the PCC particles is 0.5 to 0.75 $\mu$m (500 to 750 nm) at pH 8 to 10.5. When the latter value is exceeded the particle size of the PCC will potently increase to approximately 1.75 $\mu$m (1750 nm) at pH 11 whereafter the particle size is reduced to about 100 to 200 nm and at high pH values it is reduced further to about 50 nm.

In the following, particles in the range from 400 to 750 nm are termed agglomerates, 1750 nm particles are termed flocs, particles in the size range from about 100 to about 200 nm are termed strong agglomerates and particles of about 50 nm (40 to 100 nm) are termed aggregates according to the invention. According to the invention, novel products are obtained which can be called nanoaggregates which typically have a diameter of approximately 50 nm. By pH adjustment, these aggregates can be combined further to form bigger agglomerates of 100 to 1000 nm by adjusting the pH to a value from 6.5 to 9.5.

The present PCC particles can be produced e.g. by the following reactions:

A) $CaO+H_2O+CO_2 \rightarrow CaCO_3+H_2O$
B) $CaO+H_2O+Na_2CO_3 \rightarrow CaCO_3+2\ NaOH$
C) $CaO+H_2O+(NH_4)_2CO_3 \rightarrow CaCO_3+2\ NH_4OH$ The forming conditions vary according to the pH value of the product obtained from the carbonate forming reaction (PCC slurry).

The carbonization/causticizing reactions are particularly advantageously performed in a shock mixer providing high energy intensity (a shock mixer is described in the WO publication no. 96/23728). Thus, the carbonization is performed, e.g., in a gas phase by mixing liquid mist containing calcium hydroxide with carbon dioxide gas in a turbulence having an energy intensity greater than 1000 kW/m³. In the reaction, gas, liquid and solid particles are thus reacted with each other simultaneously under an intense turbulence and great energy intensity. The gas flow will absorb the liquid and the particles, forming a turbulent three-phase mixture. The solution can also be called the "three-phase" method because three phases are simultaneously present.

In connection with the carbonization (reaction A) the calcium oxide is thus brought into an intense mixing field together with water and carbon dioxide whereby its surface layer begins to hydrate and as a result of the hydration, $Ca(OH)_2$ is obtained which at the same time immediately begins to become carbonated. The calcium carbonate obtained from the reaction is of homogeneous quality. The carbonization or, correspondingly, causticizing, produces minute PCC particles on the surface of the lime particles. Due to the effect of the turbulence, the impact energy and the heat generated by the mixer, these particles are, however, detached from the surface of the calcium oxide or the calcium hydroxide particles. In the fluid of the mixer they do not remain independent; instead, the primary particles rapidly combine to form bigger particle aggregates or clusters of about 10 to 30, typically about 15 to 20 particles. These have a size of about 40 to 100 nm. The aggregates produce agglomerates or bunches containing about 500 to 600 aggregates joined together. The size of these bunches is about 100 to 1000 nm, for instance about 500 nm. They are quite strong and can withstand the reactor turbulence. When bigger, looser agglomerates (flocs) are grown, the turbulence is reduced. The formation of these agglomerates can be performed by adjusting the pH to such a value that the Z potential of the particles is as small as possible.

Figure 2:
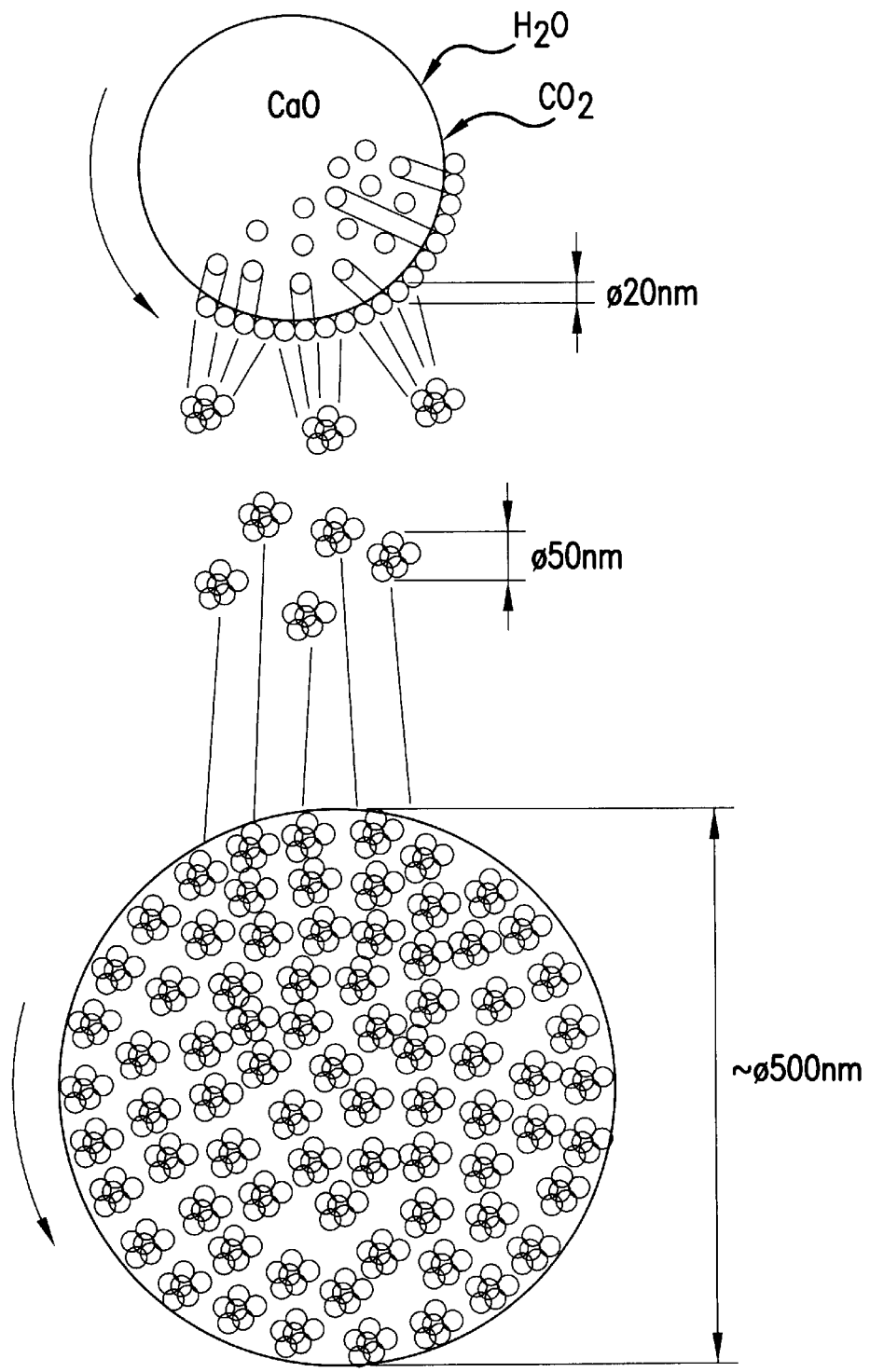
FIG. 2 depicts the generation mechanism of a bunch structure formed by carbonization.

The generation mechanism of nanoaggregates and agglomerates is also illustrated in FIG. 2.

Figure 3:
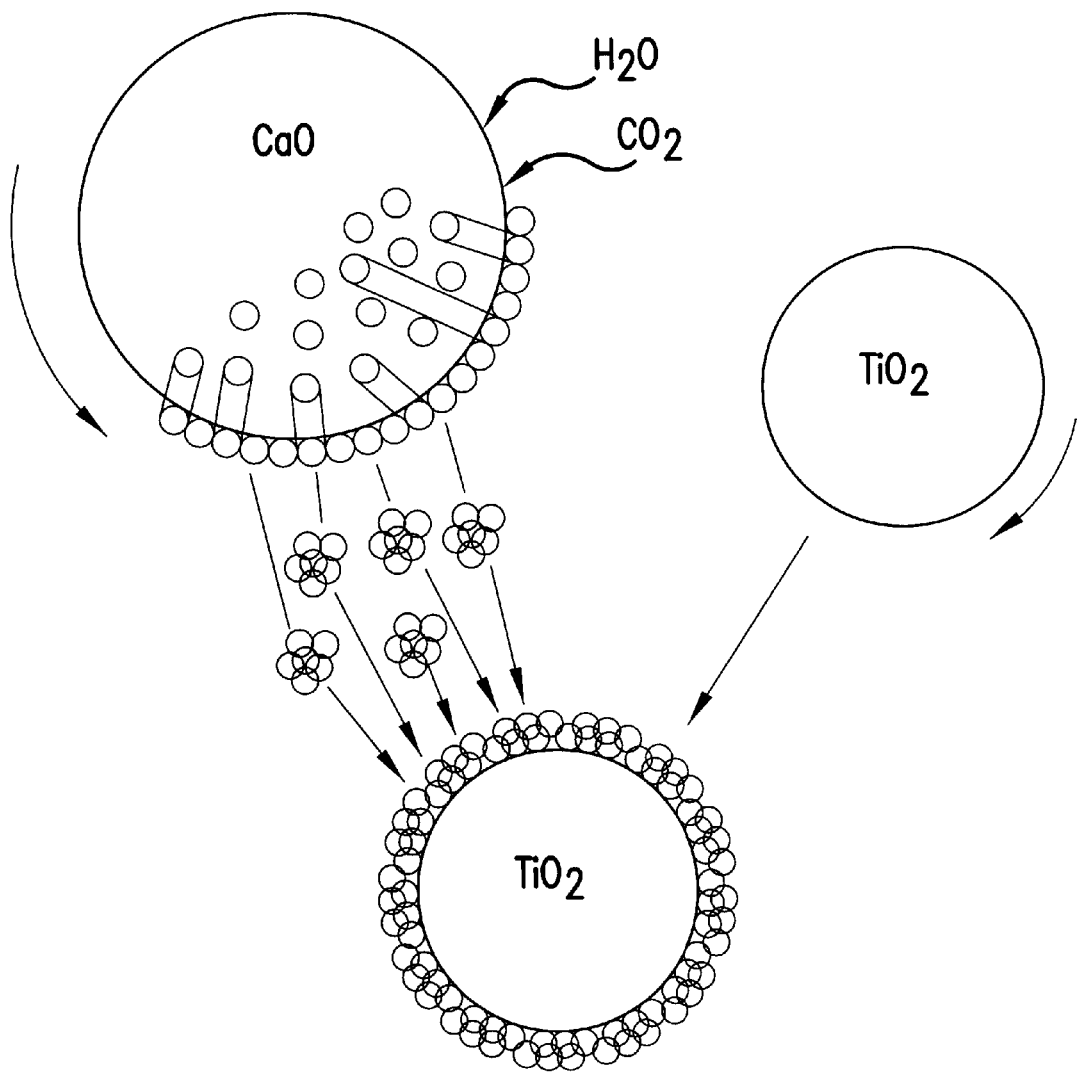
FIG. 3 depicts the coating of titanium oxide by PCC clusters.

The particles can also be used to coat other pigments such as kaolin, chalk, talcum, or titanium dioxide. The coating can be performed by feeding the pigments to be coated e.g. in the form of an aqueous slurry together with calcium oxide and carbon dioxide into the apparatus according to the invention and, if required, adjusting the pH to a suitable value by means of carbonic acid or some other acid (e.g. phosphoric acid) (see FIG. 3).

In another embodiment of the invention, finished particles are brought to the process which are coated by the minute, already formed (and not in the process of being formed) PCC particles of 10 to 50 nm. In this case, when the added pigment is in the form of an aqueous slurry having a sufficiently high dry content, the particles are evenly coated with separate PCC particles which have not been precipitated, i.e. generated e.g. onto the kaolin surface but which have instead been combined therewith after their generation. This difference is easily perceivable in e.g. electron microscope pictures.

The calcium carbonate particles generated in the carbonization process are not crystalline because the duration of their generation is too short to enable normal crystallization. They are classified as so called vaterite, that is, an amorphous calcium carbonate. This amorphousness and the simultaneously occurring fully spherical ball-like shape and the very accurately identical particle size distribution mean that the surface energy of each individual spherule is the same. For this reason they are stable in resisting crystallization and dissolution and recrystallization into a new thermodynamically more stable form.

In the causticizing process (reaction B) which can also be performed at a relatively high dry content the problem constituted by the low degree of causticizing can be solved according to the present invention by removing the uncausticized soda by crystallization from the lye formed and by returning it to the beginning of the process. In alternative B, the sodium carbonate can be replaced by potassium carbonate and carbonates of other alkali metals.

When implementing the causticizing method the following procedure is followed according to the invention:

The $Ca(OH)_2$ mixture and the $Na_2CO_3$ solution are homogeneously admixed by using, e.g., the shock mixer described below (cf. also WO 96/23728). A $Ca^{2+}$ ion cloud is then formed around the $Ca(OH)_2$ particle mainly in the diffusion zone. In the solution, $Na_2CO_3$ is present as $Na^+$ and $Co_3^{-2}$ ions. The $Ca^{2+}$ is combined with the $Co_3^{2-}$ to form $CaCO_3$ molecules which bind 8 $H_2O$ molecules and a gel-like state results. The $CaCO_3$ molecules combine to form crystal seeds and the water is released and the mixture begins to become plasticized. If the temperature at this point is below 42° C., the crystal seed is calcitic, and correspondingly, if the temperature is above 42°C., the crystal seed is aragonitic. The small, nanocrystalline $CaCO_3$ mass spherules are generated in the cloud surrounding the $Ca(OH)_2$ and their growth and organization continues until most of the $Ca(OH)_2$ has been consumed. Spherical particles are obtained formed of an unorganized $CaCO_3$ nanocrystalline mass. The situation mainly corresponds to what is shown in FIG. 2 in connection with carbonization.

The specific gravity of an aragonite crystal is 2.71 and that of a calcite crystal is 2.93. The $CaCO_3$ nanocrystalline mass contains crystal seeds in an unorganized state and its specific gravity must be smaller than that of the organized crystal formed thereof, that is, at a temperature exceeding 42° C. the specific gravity is smaller than 2.71 and at a temperature of below 42° C. the specific gravity is greater than 2.93.

The pH of the suspension of calcium carbonate crystals or particles obtained from PCC preparation is adjusted to 6.5 . . . 9.5, advantageously to 7.5 . . . 9.3, and particularly advantageously to 7.9 . . . 9.2 whereby the Z potential can be decreased to a value from −1 to −20 mV, advantageously to about −1 to −5 mV, and preferably to −1 to −3. The same goal can be reached by adding, e.g. suitable additives, dispersing auxiliaries, such as polyelectrolytes, to the suspension. Examples of these include polyacrylates, polyacryl amides, and lignosulphonates. The auxiliaries in question change the pH range within which the Z potential of the crystals is at its minimum, that is, at −1 to −20 mV. For this reason the pH value is advantageously adjusted only after the dispersing auxiliaries have been added. An advantageous pH value is typically between 6 and 10 if auxiliaries are used.

The adjustment of the pH value can be carried out directly in connection with the preparation of PCC, e.g. when PCC slurry is removed from the reactor, but it is advantageously performed in connection with filtering.

The polynuclear spherules obtained are separated from one another by means of a strong turbulence before they reach the "critical size" at which they form an integral crystal. The separate spherules form a homogeneous mixture wherein the mass/surface area ratio is the same for all spherules, which ends their interaction allowing the spherules to retain their size and shape. Thus, after setting the pH value (or after adding the additives) the suspension is mixed using a shock mixer such that it is subjected to circumferential velocities of 50 to 200 m/s, i.e. the PCC cluster being formed is shaped by means of an intense turbulence. In this manner, any bigger flocs and agglomerates possibly formed in the suspension (cf FIG. 1, right-hand part, pH>10.5) can be disintegrated into smaller polynuclear PCC agglomerates, the English term Multiple Heart PCC, MHPCC in short, being suitable for referring to such smaller agglomerates.

According to Kolmogorov's theory of turbulence amplitude the length which in a turbulent environment is the effective turbulence diameter or the like is $$L \sim (n/\exp 3E) \exp (\tfrac{1}{4}),$$

wherein
n=kinematic viscosity
L=turbulence diameter

The above equation reveals that L is the distance regarded as the turbulence diameter, whereby the shear force generated by the turbulence cannot break or modify bodies or pieces smaller than this diameter. L is inversely proportional to the ¼th power of the local mixing effect E ($kW/m^3$). Correspondingly, the diameter of said polynuclear clusters being formed is both proportional hereto and is simultaneously a function of the pH:

$$D\text{my} \sim F[F(\text{pH}), L]$$

wherein Dmy is the total diameter of a polynuclear cluster.

Figure 4C:
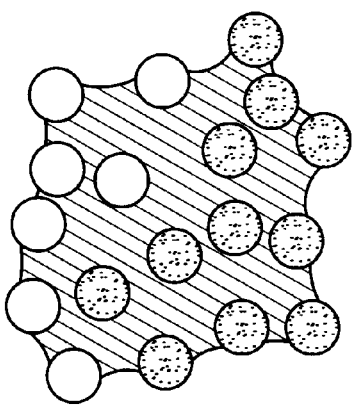
FIGS. 4a to 4c depict the principal structure of a cluster structure consisting of 18 PCC particles whereby the particles of FIG. 4a are connected by separate liquid bridges, those of FIG. 4b by a bridge net, and liquid-filled capillary interstices remain between the particles of FIG. 4c.
Figure 4B:
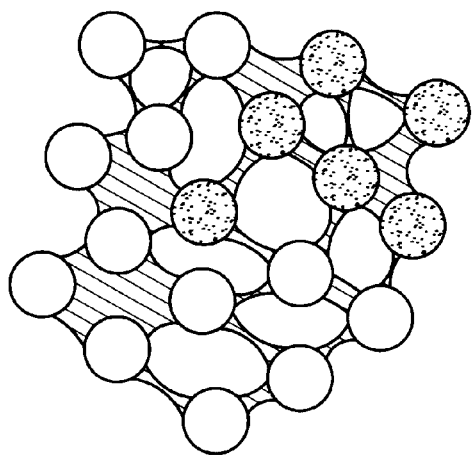
Figure 4A:
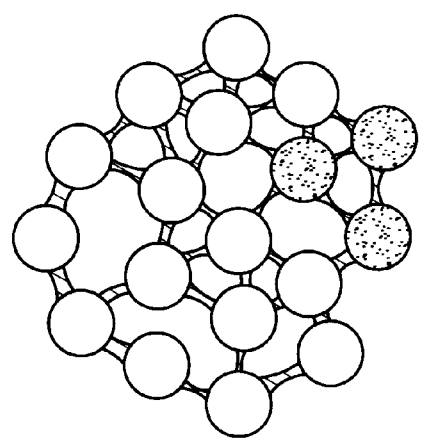
Figure 5:
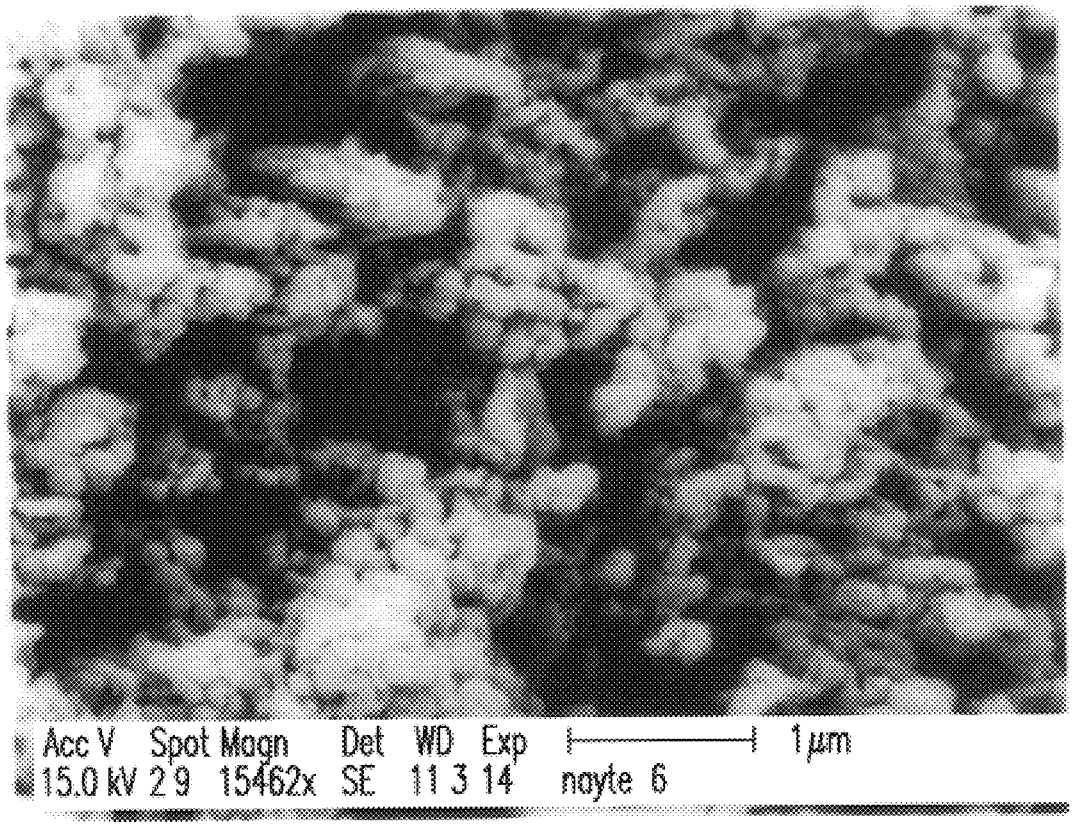
FIG. 5 is an electron microscope picture of a bunch consisting of PCC particles.

FIG. 4 is an electron microscope picture of the above-mentioned agglomerates. As will emerge from the Figure, the agglomerates are botryoidal and contain PCC nanoparticles (typically about five to eight thousand pcs) joined by van der Waals forces, the particle size thereof being 40 to 400 nm, advantageously about 40 to 200 nm, and preferably about 40 to 120 nm. The size of the agglomerate is about 0.1 to 10 $\mu$m, typically about 0.2 to 9 $\mu$m. The particles forming the agglomerate are essentially spherical and equal in size, the deviation being preferably smaller than 10%. Even the agglomerates as such are spherical or essentially spherical. They are elastic because they are kept together by van der Waals forces and not due to the effect of additives, whereby they in the bulk or on the surface of paper are easily modified into the desired shape in connection with paper finishing. In addition, they contain an open channel network, the formation of which is examined in FIG. 4.

The term "spherical" is used of the structures (particles and, correspondingly, clusters) visible in the electron microscope picture because the sphere is that regular geometrical three-dimensional figure which most closely approximates to the configuration of the structure.

According to an advantageous embodiment of the invention steps are taken in which the particles which are attached to each other in a box filter are washed with washing water containing a suitable acid (for example carbon dioxide is dissolved in the washing water) whereby the pH value of the filter cake is reduced preferably to 8.4±0.5 whereby the Z potential is reduced to −1 to −2 mV and the particles are attached to each other by means of van der Waals forces. The carbon dioxide reduces the pH value of the filter cake, and by simultaneously reducing the pressure on the filtering side it is possible to generate gas inside the filter cake whereby the released gas displaces the liquid between the particles. This will emerge from FIG. 4 which illustrates the states of saturation in a randomly packed agglomerate. The Figure on the right (FIG. 4c) depicts the situation prior to washing, the capillary interstices between the particles being filled by liquid. By washing with a carbon dioxide containing washing liquid and by releasing carbon dioxide liquid can be removed from the space between the particles (FIG. 4b) whereby finally separate liquid bridges remain and a porous structure (FIG. 4a) is obtained.

A continuous mat of particles is formed. After filtration, the agglomerates are treated in a mixer having an intense turbulence. As a function of the intensity of the turbulence the agglomerates gain a spherical shape and a diameter corresponding to the intensity of the turbulence. Thus, when the content of the box filter is then emptied and subjected to an intense turbulence, the regular agglomerates of the invention are obtained.

When producing the above-mentioned agglomerates in a box filter the amount of solids presupposes that the mutual distance between the particles is smaller than 0.1 $\mu$m. It has been found in connection with the invention that the described botryoidal agglomerate structures are advantageously obtained by adjusting the dry content of the PCC slurry essentially to a percentage from 40 to 90%, preferably to about 50 to 60%, and, as stated above, by conducting washing water into the filter, carbon dioxide gas having been dissolved into the washing water in order to adjust the pH value to 7.5 . . . 9.5, preferably to about 7.9 . . . 9.2. As a result the particles cling to each other.

It has been found in connection with the invention that the size of the MHPCC particles formed can be effectively controlled by means of the ratio between the shearing force and the Z potential such that by reducing the Z potential the same particle size is obtained with a smaller difference in peripheral speed, and correspondingly, a greater particle size can be obtained by keeping the Z potential constant and by diminishing the difference in peripheral speed.

According to the invention, a device is used for the disintegration of the agglomerates (as well as for carrying out the carbonisation and the causticizing) which on revolving peripheries has disc-like collision surfaces producing a force (after collision) which causes the liquid and the suspension to flow in the direction of centrifugal force from the vanes of an inner mixing ring onto the vanes of a concentric outer mixing ring whereby the mixture is subjected to relatively intense forces when travelling from one vane to another, these forces being due to differences in speed and/or direction of rotation between successive vane rings. The device is here used such that liquid and slurry is fed thereto at a smaller volume flow capacity than that applied when liquid and slurry is removed therefrom. In such a device the discs are either radial or slightly inclined toward the direction of rotation. The opportunity offered by a shock mixer to perform homogeneous mixing and shearing forces as a result of the shocks between the solids and the solid shock surface is, calculated as probabilities, by far more homogeneous than in other types of mixers. Typically over 95% of the material flow is subjected to almost 100% of the maximal shock energy and only 5 to 10% of the material is subjected to less than 60% of the maximal shock energy while this divergence corresponding to the intensity of the mixing turbulence is many times greater in all mixers, even the so called high-shear mixers of the dissolver type. For the above reasons, as a contrast to an ordinary mixer, the redisintegration of the aggregates and flocs formed is almost complete in said shock mixer.

The suspension obtained from the preparation of PCC being fairly alkaline, the suspension is in practice neutralized by adjusting the pH. Acids are typically used for neutralization. Various kinds of inorganic acids can be used, e.g., mineral acids, such as sulphuric acid, nitric acid and hydrochloric acid. Phosphoric acid has been found advantageous. Even organic acids, such as formic acid, acetic acid and propionic acid or sulphonic acid, may be used.

As stated above, the minute separate PCC particles formed according to an advantageous embodiment of the invention are, however, neutralized with carbon dioxide. This is particularly advantageously done in a box filter whereby carbon dioxide gas is introduced into the washing water shortly before the filter. Even the mineral acid (e.g. phosphoric acid) can be added into the filter.

It has been found that a calcium phosphate layer can be formed on the agglomerates by surface treating them with phosphoric acid. Due to the effect of the mixer turbulence the calcium phosphate molecules are placed at the level of the surface.

The following examples are provided by way of clarifying the invention:

EXAMPLE 1

Precipitated PCC having an average particle size of 0.1 microns was treated with carbon dioxide in a box filter in order to adjust the pH to 8.2, the initial value being 10.5, by using wash water saturated with $CO_2$ gas. This pH stabilized slurry whose dry content was 50% was led to a heavy-duty mixer (of the model Desintegrator) wherein the peripheral velocities were in the range of 49 m/s and the differences in peripheral velocities between rings revolving in opposite directions were in the range of 96 m/s. The distance between mixer rings revolving in opposite directions was 0.005 m. The dwell time in the apparatus was only<0.1 s between the rings. The temperature was room temperature, i.e. about 20° C.

The viscosity of the MHPCC particles (measured using a Brookfield viscosimeter) was reduced during the treatment from the original (PCC 0.1 microns) value of 1000 cP to a value of 200 cP while the dry content in each case was 50%. The average size of the MHPCC particles produced was then 0.8 to 1.2 microns.

Filterability was doubled or tripled calculated on filtering speed and correspondingly the speed of infiltration of the wash water through the filter cake without the described treatment.

MHPCC particles were obtained having an average diameter of 0.8 to 1.2 microns, the separate forming particles being about 0.1 microns in diameter.

The environment neutralized with phosphoric acid simultaneously formed a thin layer of calcium phosphate on the surface of the MHPCC particle but not at its nucleus. This could be seen when the MHPCC was treated with dilute acids which were stronger than carbon dioxide, e.g. with acetic acid. Acetic acid is always present e.g. in the circulation water of a paper making machine and in corresponding waters.

EXAMPLE 2

The formed MHPCC which had been treated with dilute phosphoric acid in order to adjust the ph to 8.2 was contacted with the circulation water of the paper making

What is claimed is:

1. Precipitated calcium carbonate agglomerates containing a number of spherical calcium carbonate particles which are attached to each other and have a particle size of approximately 40 to 200 nm, wherein the particles are spherical with a deviation of less than about 10%.

2. The agglomerates according to claim 1, wherein the agglomerates have a size of approximately 0.1 to 10 μm and the calcium carbonate particles have a size of approximately 40 to 120 nm.

3. The agglomerates according to claim 1, wherein the agglomerates have a plurality of internal reflecting surfaces.

4. A method for preparing calcium carbonate, which comprises:

reacting a calcium oxide containing starting material with carbonate ions by adjusting a Z potential to −1 to −20 mV in a suspension by lowering a pH to 8.4±0.5; and recovering calcium carbonate in the form of agglomerates whose size is approximately 0.1 to 10 μm and which contain calcium carbonate particles having a size of approximately 40 to 200 nm, and the calcium carbonate particles are spherical with a deviation of less than about 10%.

5. The method according to claim 4, wherein the agglomerates have a plurality of internal reflecting surfaces.

6. The method according to claim 4, wherein dispersion auxiliaries are added to the suspension whereafter the pH value of the suspension is adjusted such that the crystals have a Z potential of −1 to −20 mV.

7. The method according to claim 6, wherein in that as the dispersion auxiliaries, polyelectrolyte is used.

8. The method according to claim 4, wherein precipitated calcium carbonate particles are prepared being in the form of polynuclear, essentially spherical agglomerates having a size of about 400 to 750 nm.

9. The method according to claim 4, wherein to adjust the pH of the suspension, inorganic or organic acids are used.

10. The method according to claim 9, wherein carbonic acid or phosphoric acid is used to adjust the pH.

11. The method according to claim 4, wherein lowering the pH of the suspension is performed by introducing carbon dioxide gas into the suspension during filtering.

12. The method according to claim 4, wherein the calcium carbonate is formed according to the following reaction:

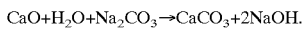

$CaO+H_2O+Na_2CO_3 \rightarrow CaCO_3+2NaOH.$

13. The method according to claim 4, wherein the calcium carbonate is formed according to the following reaction:

$CaO+H_2O+CO_2 \rightarrow CaCO_3+H_2O.$

* * * * *